(12) United States Patent
Ross et al.

(10) Patent No.: US 10,489,860 B1
(45) Date of Patent: Nov. 26, 2019

(54) SYSTEMS AND METHODS FOR DEVELOPING CONVERTIBLE TERM PRODUCTS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 436 days.

(21) Appl. No.: 14/576,704

(22) Filed: Dec. 19, 2014

Related U.S. Application Data

(60) Provisional application No. 61/920,056, filed on Dec. 23, 2013, provisional application No. 61/920,062, filed on Dec. 23, 2013, provisional application No. 61/920,071, filed on Dec. 23, 2013.

(51) Int. Cl.
*G06Q 40/08* (2012.01)

(52) U.S. Cl.
CPC .................... *G06Q 40/08* (2013.01)

(58) Field of Classification Search
CPC ........ G06Q 40/00; G06Q 40/02; G06Q 40/08; G06Q 50/22; G06Q 50/24
USPC .......................................................... 705/4
See application file for complete search history.

(56) References Cited

U.S. PATENT DOCUMENTS

| | | | | |
|---|---|---|---|---|
| 8,195,484 B2* | 6/2012 | Jones | ............... | G06Q 40/08 705/4 |
| 8,301,486 B1* | 10/2012 | Marsten | ............ | G06Q 30/00 705/36 R |
| 8,355,934 B2* | 1/2013 | Virdhagriswaran | ............ | G06Q 10/067 705/4 |
| 8,498,915 B2* | 7/2013 | Eder | ............ | G06Q 40/06 705/35 |
| 8,560,421 B1* | 10/2013 | Erlanger | ............ | G06Q 40/06 705/36 R |
| 8,595,103 B1* | 11/2013 | Wargin | ............ | G06Q 40/08 705/35 |
| 8,650,050 B1* | 2/2014 | Lee | ............ | G06Q 30/0281 705/1.1 |
| 2002/0091550 A1* | 7/2002 | White | ............ | G06Q 40/08 705/4 |
| 2005/0154617 A1* | 7/2005 | Ruggieri | ............ | G06Q 40/08 705/4 |
| 2006/0041455 A1* | 2/2006 | Dehais | ............ | G06Q 40/08 705/4 |

(Continued)

OTHER PUBLICATIONS

SourceMedia, Inc., The XXX Files—Financial Planning: 169. SourceMedia, Inc., Oct. 1996 text—Donald Jay Korn regarding term life insurance. Copyright 1996 SourceMedia, Inc., 4 pages (Year: 1996).*

*Primary Examiner* — Benjamin S Brindley

(74) *Attorney, Agent, or Firm* — Eric L. Sophir; Dentons US LLP

(57) ABSTRACT

Methods and systems for developing profitable convertible term products are disclosed. The methods include the disaggregation of the pricing of existing term products and the use of big data analytics to identify opportunities to improve the acceptance of the product within a particular share of the market. Then, a pricing model and a selling model are built to test the product.

14 Claims, 4 Drawing Sheets

(56) References Cited

U.S. PATENT DOCUMENTS

| | | | |
|---|---|---|---|
| 2008/0319811 A1* | 12/2008 | Casey | G06Q 10/06 |
| | | | 705/7.13 |
| 2009/0048877 A1* | 2/2009 | Binns | G06F 19/328 |
| | | | 705/4 |
| 2011/0047098 A1* | 2/2011 | Erlanger | G06Q 40/02 |
| | | | 705/36 R |

* cited by examiner

SYSTEMS AND METHODS FOR DEVELOPING CONVERTIBLE TERM PRODUCTS

CROSS-REFERENCE TO RELATED APPLICATIONS

This application claims priority to U.S. Provisional Patent Application Ser. No. 61/920,056, filed Dec. 23, 2013; U.S. Provisional Patent Application Ser. No. 61/920,062, filed Dec. 23, 2013; and U.S. Provisional Patent Application Ser. No. 61/920,071, filed Dec. 23, 2013; which are hereby incorporated by reference in their entirety.

FIELD OF THE DISCLOSURE

The present disclosure relates in general to insurance products, and more specifically to systems for developing convertible term products.

BACKGROUND

Insurance products currently available in the market may not be attractive to some costumer groups because of their relatively high cost and the lack of flexibility of some products. This occurs frequently when trying to offer insurance products to younger consumers. Some products may include the type of protection a customer is seeking, but the products may be too expensive or the customer may not be looking to purchase permanent insurance. There are some term products in the market that face similar problems and the constantly changing trends within the market may increase the difficultly of creating new insurance products to address the new needs of the market.

There is therefore a need for methods of creating new convertible term products capable of addressing the needs of constantly changing markets, directed specially to young customers.

SUMMARY

Methods for developing profitable convertible term products are disclosed. The methods may include computer implemented systems for the disaggregation of the pricing of existing term products. The systems may apply big data analytics to identify opportunities to improve the acceptance of the product within a particular share of the market. Then, the system may build a pricing model and a selling model to test the product.

The method of developing new convertible term products may start when an existing term product may be selected by an analytics engine manager for modification. Then, according to some embodiments, a product definition module may generate a new product specification for a final product. Information about the term product may be retrieved by the analytics engine manager from the product database.

Afterwards, one or more product analysis modules within the analytics engine of the present disclosure may evaluate the performance of the term product against other similar products in the market. In some embodiments, the capability of a product to address the needs of different niche markets may be assessed by these product analysis modules, along with product pricing, product positioning, product promotion and related advertisement and customer satisfaction, among others.

Then, one or more pricing modeling modules within the analytics engine of the present disclosure may divide the term product into its constituent parts in terms of pricing. Afterwards, one or more data analysis modules available within the analytics engine of the present disclosure may apply big data analytics to information from a big data database and may gain insights that may help to identify the impact that changes in particular elements of a product may have on a pricing model.

Subsequently, using the knowledge acquired by data analysis modules from application of big data analytics, the one or more product reconstitution modules within the analytics engine of the present disclosure may reconstitute and re-price the convertible term product.

After product reconstitution modules have defined the new product, a selling model may be created and established by one or more sales modeling modules within the analytics engine of the present disclosure.

With a selling model in place, the new convertible term product may undergo a pilot test. The test may be designed by a testing module within the analytics engine of the present disclosure.

After the successful assessment of the performance of the convertible term product, the product may be added to a product portfolio.

In one embodiment, a computer-implemented method comprises selecting, by an analytics engine manager module of a server, an existing term product for modification; generating, by a product definition module of the server, a product specification for a new term product based upon information retrieved from a product database and parameters inputted on a client computing device; evaluating, by a product analysis module of the server, performance of the new term product against at least one other term product; dividing, by a pricing modeling module of the server, the new term product into constituent parts based on pricing; analyzing, by the pricing modeling module of the server, impact of proposed changes to the constituent parts by comparing the proposed changes to historical data in a database to determine any modification of each constituent to achieve an identified result for the new term product; and reconstituting, by a product reconstitution module of the server, the term product from the constituent parts and re-pricing the constituent parts based on the analysis of the impact of proposed changes to the constituent parts and any modification of each constituent to achieve the identified result for the new term product.

In another embodiment, a system comprises a server comprising: an analytics engine manager module of the server configured to select an existing term product for modification; a product definition module of the server configured to generate a product specification for a new term product based upon information retrieved from a product database and parameters inputted on a client computing device; a product analysis module of the server configured to evaluate performance of the new term product against at least one other term product; a pricing modeling module of the server configured to divide the new term product into constituent parts based on pricing and analyze impact of proposed changes to the constituent parts by comparing the proposed changes to historical data in a database to determine any modification of each constituent to achieve an identified result for the new term product; and a product reconstitution module of the server configured to reconstitute the term product from the constituent parts and re-pricing the constituent parts based on the analysis of the impact of proposed changes to the constituent parts and any modification of each constituent to achieve the identified result for the new term product.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
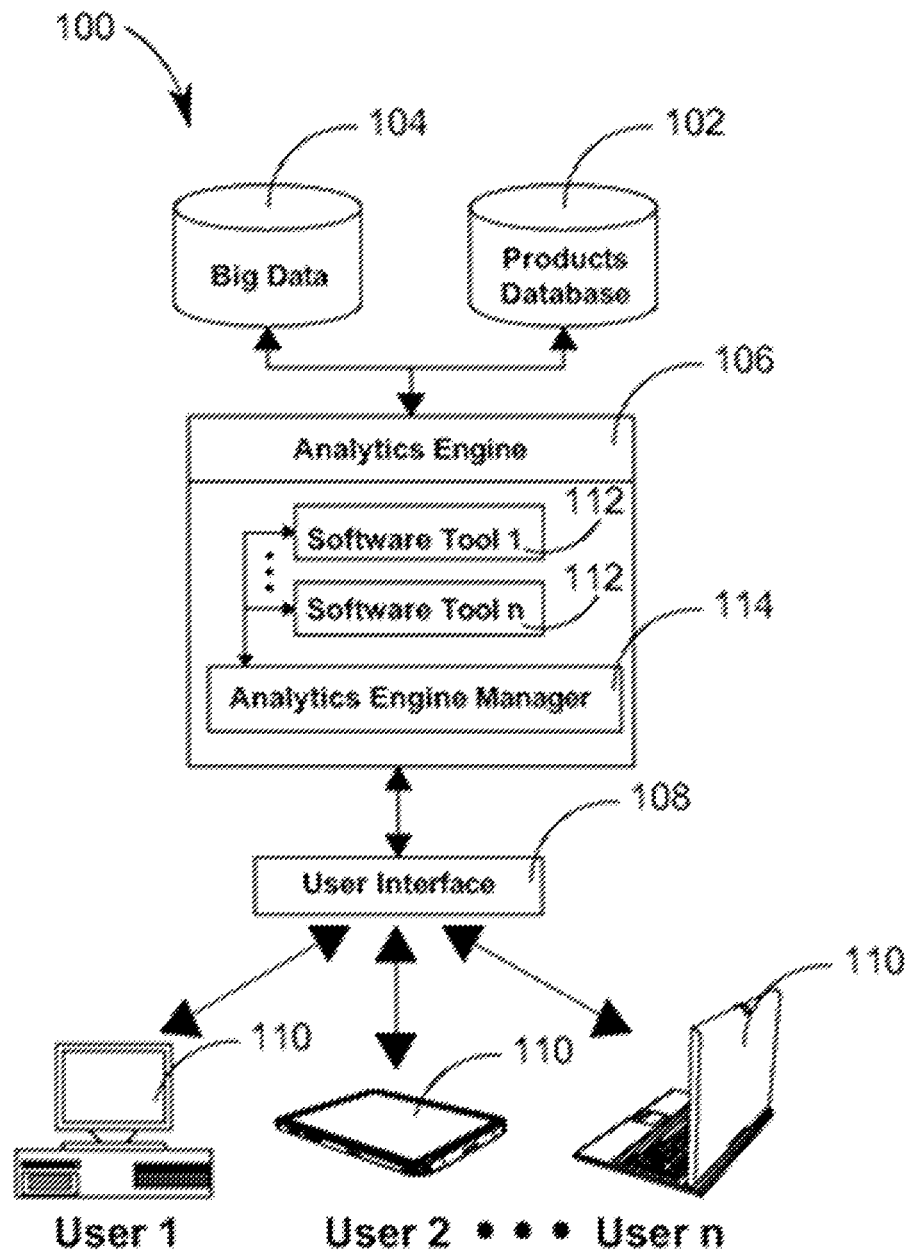
FIG. 1 is a functional block diagram illustrating a system architecture, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Product" refers to a contract between a first entity and a second entity, where the first entity undertakes to compensate the second entity upon the occurrence of one or more defined losses.

"Convertible Term Product" refers to a product that can be changed by another product with different characteristics during or after the validity period of the contract.

Methods for developing profitable convertible term products are disclosed. The methods may include the disaggregation of the pricing of existing term products and the use of big data analytics to identify opportunities to improve the acceptance of the product within a particular share of the market; then building a pricing model and a selling model to test the product. The disclosed methods may be implemented by users in interaction with computer systems. In one or more embodiments, the computer systems may include an analytics engine which may include any number of software tools running on any number of computing devices where the computing devices may communicate using any network infrastructure. Examples of computing devices may include personal computers, tablet devices, and mobile phones, amongst others. Examples of network infrastructures may include intranets, local area networks (LAN), virtual private networks (VPN), wireless area networks (WAN) and the world wide web, amongst others.

FIG. 1 is a functional block diagram of a product development System Architecture. In FIG. 1, system architecture 100 includes product database 102, big data database 104, analytics engine 106, user interfaces 108 and users 110. Analytics engine 106 includes software tools 112 and analytics engine manager 114. In some embodiments, system architecture 100 includes additional, fewer, different, or differently arranged components than those illustrated in FIG. 1.

In FIG. 1, product database 102 and big data database 104 are coupled to and in communication with analytics engine 106 via a network infrastructure. Examples of such network infrastructures include intranets, local area networks (LAN), virtual private networks (VPN), wireless area networks (WAN), the internet, and the world wide web, amongst others.

In some embodiments, product database 102 is implemented as a database stored on a server (not shown) using database management systems (DBMS). Examples of such DBMS include MySQL, PostgreSQL, SQLite, Microsoft SQL Server, Microsoft Access, Oracle, SAP, dBASE, FoxPro, IBM DB2, LibreOffice Base, FileMaker Pro and any other type of database that organizes collections of data. In other embodiments, big data database 104 is implemented as a database stored on a server (not shown) using DBMS. Examples of such DBMS include MySQL, PostgreSQL, SQLite, Microsoft SQL Server, Microsoft Access, Oracle, SAP, dBASE, FoxPro, IBM DB2, LibreOffice Base, FileMaker Pro and any other type of database that organizes massive collections of data. In yet other embodiments, analytics engine 106 is implemented as computer hardware and software including any number of components required for running a desired set of applications, including any number of processors, random access memory modules, physical storage drives, wired communication ports, wireless communication ports, and the like. In these embodiments, analytics engine 106 is configured to be able to work with massive sets of data, and includes any number of software tools 112 and analytics engine manager(s) 114. In these embodiments, software tools 112 and analytics engine manager 114 are software modules running on hardware within analytics engine 106.

In some embodiments, product database 102 stores information related to past, current, and future products that a product-offering entity makes available to a market. In other embodiments, big data database 104 stores large amounts of data that serves to derive insights about new market opportunities and customer behavior. In these embodiments, the information stored within big data database 104 is derived from internal and/or external sources.

In other embodiments, software tools 112 are configured to run on a number of processing units and are further configured to handle massive collections of data. In some embodiments, software tools 112 include modules for processing insurance products, such as, for example, product analysis modules, pricing modeling modules, data analytics modules, product reconstitution modules, and sales modeling modules, among others. In some embodiments, each module is configured to interact with one or more other modules within analytics engine 106. In an example, software tools 112 are configured to interact with modules of the same type. In another example, software tools 112 are configured to interact with modules of different types. In some embodiments, software tools 112 interact with analytics engine manager 114 within analytics engine 106. In other embodiments, analytics engine manager 114 processes requests from users 110. In these embodiments, analytics engine manager 114 coordinates the work of the different modules in the method of developing new products.

In some embodiments, user 110 interacts with one or more components within system architecture 100 via user Interface 108. In an example, analytics engine 106 generates user interface 108 on a computing device (not shown) that displays information provided by any number of software tools 112 running on analytics engine 106. Examples of such computing devices include personal computers, tablet devices, and mobile phones, amongst others. In other embodiments, user interface 108 is configured to allow user 110 to interact with software tools 112 for use in the method of developing new products. In these embodiments, user interface 108 allows users 110 to request the development of a new product and provide feedback to the different modules regarding the product development method. In some embodiments, user 110 is part of a product offering entity.

Figure 2:
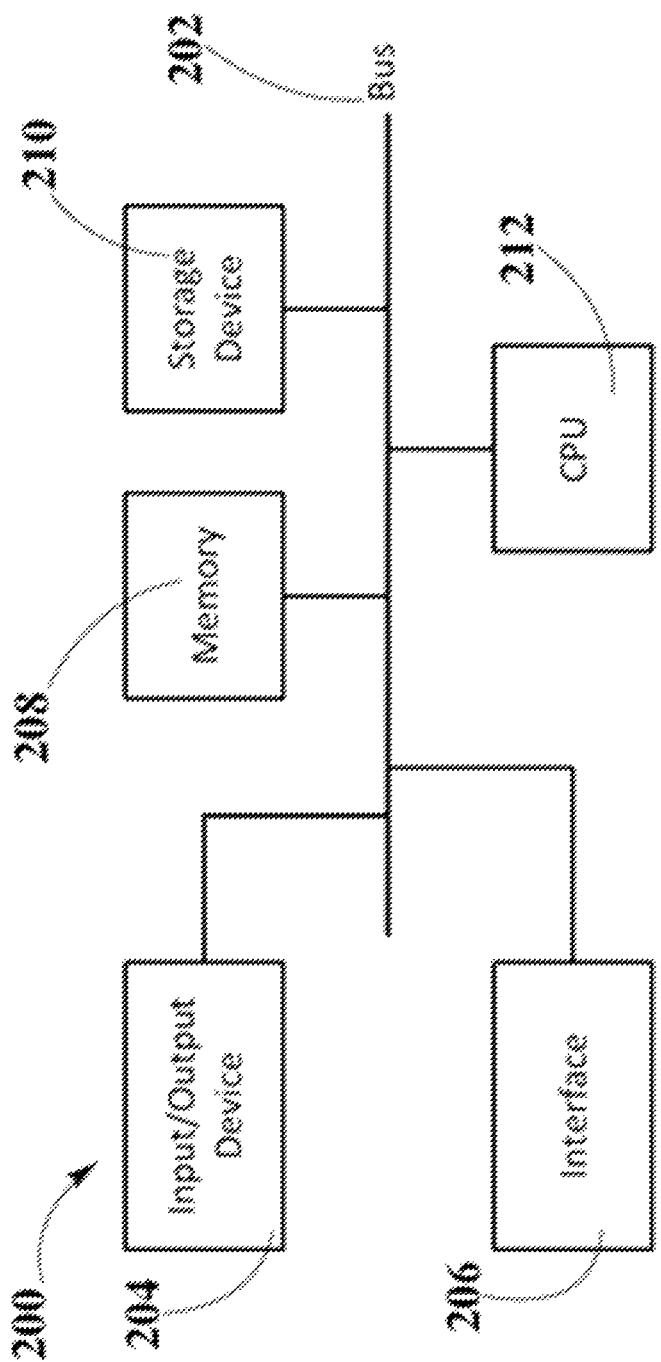
FIG. 2 is an illustration of an exemplary computing device in which one or more embodiments of the present disclosure may operate, according to an embodiment.

In FIG. 2, bus 202 is in physical communication with I/O device 204, communication interface 206, memory 208, storage device 210, and central processing unit 212. Bus 202 includes a path that permits components within computing device 200 to communicate with each other. Examples of I/O device 204 include peripherals and/or other mechanism that may enable a user to input information to computing device 200, including a keyboard, computer mice, buttons, touch screens, voice recognition, and biometric mechanisms, and the like. I/O device 204 also includes a mechanism that outputs information to the user of computing device 200, such as, for example a display, a light emitting diode (LED), a printer, a speaker, and the like.

Examples of communication interface 206 include mechanisms that enable computing device 200 to communicate with other computing devices and/or systems through network connections. Examples of network connections include connections between computers, such as, for example intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, analytics engine 106, and the like. Examples of these implementations include servers, authorized computing devices, smartphones, desktop computers, laptop computers, tablet computers, PDAs, another type of processor-controlled device that may receive, process, transmit digital data, and the like. Additionally, computing device 200 may perform certain operations that are required for the proper operation of system architecture 100. Computing devices 200 may perform these operations in response to central processing unit 212 executing software instructions contained in a computer-readable medium, such as memory 208.

In one embodiment, the software instructions of components system architecture 100 are read into memory 208 from another memory location, such as storage device 210, or from another computing device 200 (e.g., analytics engine 106, and the like) via communication interface 206. In this embodiment, the software instructions contained within memory 208 instruct central processing unit 212 to perform processes that will be described in FIGS. 3-6, below. Alternatively, hardwired circuitry may be used in place of or in combination with software instructions to implement processes described herein. Thus, implementations described herein are not limited to any specific combination of hardware circuitry and software.

Figure 3:
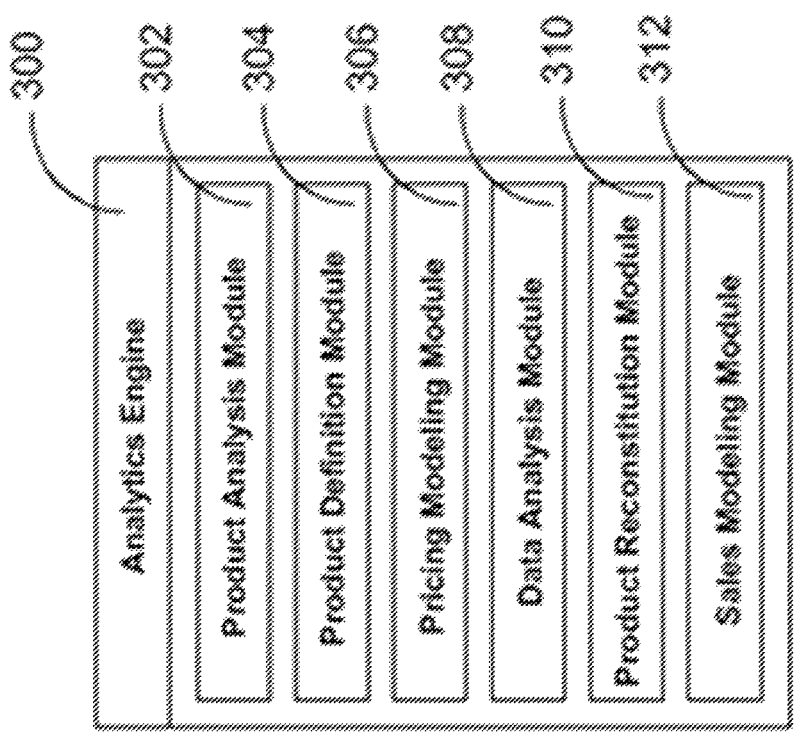
FIG. 3 is a functional block diagram illustrating an analytics engine, according to an embodiment.

FIG. 3 is a functional block diagram illustrating an analytics engine for disaggregating or dividing constituents of a product, re-pricing a product, and reconstituting a product. In some embodiments, analytics engine 300 includes product analysis module 302, product definition module 304, pricing modeling module 306, data analysis module 308, product reconstitution module 310, and sales modeling module 312. In other embodiments, analytics engine 300 includes fewer, additional, different, or differently configured components than those shown in FIG. 3.

In some embodiments, analytics engine 300 is implemented as computer hardware and software configured to run a desired number of software modules and to connect to other components in a system architecture, such as, for example, system architecture 100 of FIG. 1. In an example and referring to FIG. 2, analytics engine 300 is implemented as a server implementing one or more components/elements/functions contained within computing device 200. In some embodiments, product analysis module 302, product definition module 304, pricing modeling module 306, data analysis module 308, product reconstitution module 310, and sales modeling module 312 are implemented as individual software modules running on hardware associated with analytics engine 300. In other embodiments, one or more of product analysis module 302, product definition module 304, pricing modeling module 306, data analysis module 308, product reconstitution module 310, and sales modeling nodule 312 are implemented as software modules able to perform multiple tasks associated with two or more of the aforementioned modules.

According to some embodiments, product analysis module 302 within analytics engine 300 evaluates the performance of a term product against other similar products in the market. In these embodiments, product definition module 304 generates product specifications for new products. Further to these embodiments, pricing modeling module 306 is configured to divide the term product into its constituent parts in terms of pricing. In these embodiments, data analysis module 308 is configured to apply big data analytics to information from a big data database and provide insights that may help to identify the impact that changes in particular elements of a product may have on a pricing model. In an example and referring to FIG. 1, data analysis module 308 applies information from big data database 104. In other embodiments, product reconstitution modules 310 is designed to reconstitute and re-price a convertible term product. In yet other embodiments, sales modeling module 312 is designed to create and establish one or more sales models for convertible term products.

Figure 4:
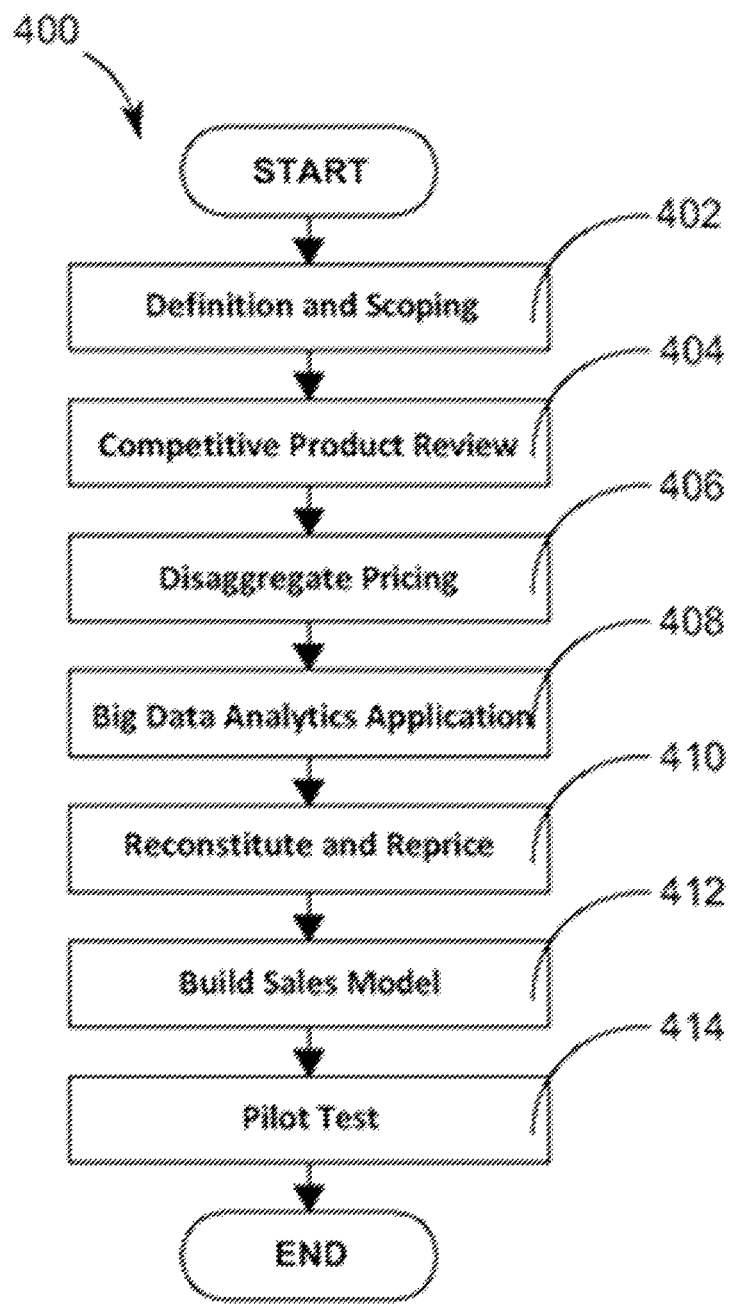
FIG. 4 is a flowchart of a method for developing convertible term products, according to an embodiment.

FIG. 4 is a flow diagram illustrating an exemplary method for developing convertible term products. Method 400 is implemented using one or more components of the exemplary operating systems/devices of FIGS. 1-3. The steps of this exemplary method are embodied in a computer readable medium containing computer readable code such that the steps are implemented when the computer readable code is executed by a computing device. In some implementations, certain steps of the method can be combined, performed simultaneously, performed in a different order, or omitted, without deviation from the objective of the method.

In FIG. 4, the method begins with definition and scoping 402, in which an analytics engine manager, such as, for example analytics engine manager 114, selects an existing term product for modification. In this step, a software module, such as, for example product definition module 304 establishes parameters for the expected final product. In some embodiments, a software module, such as for example product definition module 304, generates a product specification for the final product. In other embodiments, information about the term product is retrieved by an analytics engine manager, such as for example analytics engine manager 114, from a product database, such as for example products database 102. The parameters for the information may include resources available for the project, target market share, desired impact on target market share, and expected return on investment, among others. In some embodiments, definition and scoping 402 is performed by relevant authorities within a product offering entity. In yet other embodiments, definition and scoping 402 is performed by clients of the product offering entity interacting with the product development system of the present disclosure.

The term product then undergoes competitive product review 404. During this process, a product analysis module, such as, for example product analysis module 302, evaluates the performance of the term product against other similar products in the market. Similar products may be identified as those products having at least one parameter or characteristic (e.g., term, amount) in common with the existing product or the modified new product. In some embodiments, the ability of a product to address the needs of different niche markets is assessed by the product analysis module, along with product pricing, product positioning, product promotion, related advertisement, and customer satisfaction, among others. In other embodiments, this step aids an analytics engine manager to determine a product strategy and allow the definition of necessary differentiation that the term product may need to achieve the desired impact on the market. In these embodiments, an analytics engine manager performs this task in conjunction with a product reconstitution module, such as, for example product reconstitution module 310.

Method 400 continues with disaggregate pricing 406 in which one or more pricing modeling modules, such as, for example pricing modeling module 306, divide the term product into its constituent parts in terms of pricing. A data analysis module, such as data analysis module 308, then applies big data analytics 408 to information from databases. The data analysis module provides insights that help identify the impact that changes in particular elements may have on a pricing model. This analysis may compare the proposed changes to historical data in a database to determine how a modification of a constituent of the term product can achieve an identified result for the new term product. In some embodiments, the data analysis modules identifies which elements of the term product may be deleted, modified, or re-priced in order to achieve the desired results. In other embodiments, a product reconstitution module adds complementary constituent parts to the term product. In an example, opportunities for improvement may include a reduction in the pricing of acquisition, commissioning, algorithmic underwriting, and maintenance.

Using the information acquired by the data analysis modules from the application of big data analytics 408, product reconstitution modules then reconstitute and re-price 410 the convertible term product. In some embodiments, the reconstituted convertible term product is specifically tailored to address the need defined by the analytics engine manager and the product analysis module. In other embodiments, the reconstituted term product is tailored to address the needs defined by one or more users interacting with the system. In yet other embodiments, the reconstituted convertible term product may include one or more conversion options applicable during the term or at the end of the term.

After product reconstitution modules have defined a reconstituted product, sales modeling modules, such as, for example sales modeling module 312 and build sales model 412. In some embodiments, this step includes the creation of one or more advertisement campaigns, the definition of transaction capabilities, and ongoing services. In these embodiments, the definition of the transaction capabilities helps to keep the pricing of the product in a profitable range and prevents profit leakage.

The new convertible term product then undergoes pilot test 414. In some embodiments, the test is designed by a testing software module running on an analytics engine. The product is then tested on the market at a small scale to determine if the convertible term product satisfies the requirements identified during definition and scoping 402 and competitive product review 404. In some embodiments, the test is carried out by users within the product offering entity. If the assessment shows weaknesses in the performance of the convertible term product, the product may undergo competitive product review 404. After the successful assessment of the performance of the convertible term product, the product is added to a product portfolio stored in a suitable product database, such as, for example product database 102.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
    upon displaying a user interface on a computing device associated with a first user, receiving, by an analytics engine manager module of a server, a selection of an existing term product dataset for modification;
    retrieving, by a product analysis module of the server, from a product database, the existing term product dataset;
    retrieving, by the product analysis module of the server, from the product database, a second term product dataset, wherein the second term product dataset shares at least one characteristic value with the existing term product dataset;
    evaluating, by the product analysis module of the server, performance of the existing term product dataset against the second term product dataset by comparing a performance value associated with each of the existing term product dataset and the second term product dataset;
    dividing, by a pricing modeling module of the server, the existing term product dataset into constituent parts based on a price of each constituent part;
    executing, by the pricing module of the server, a computer-generated model configured to:
        iteratively analyze impact of proposed changes to the constituent parts by comparing the proposed changes to historical data in a database to determine any modification of each constituent to achieve a result by determining at least one constituent part to be modified;
        analyze a second user's needs based on user profile comprising user information provided by the user and previously purchased products using natural language processing;
        generate a third term product dataset from the constituent parts based on the second user's needs, and assign a new price value to the constituent parts based on the analysis of the impact of proposed changes to the constituent parts and any modification of each constituent;
    executing, by a product dataset reconstitution module of the server, a simulation protocol to analyze a capability of the third term product dataset to address market needs by assessing product pricing for the third term product dataset and determine if the third term product dataset satisfies market needs;
    when the third term product satisfies the market needs:
        updating, by the product dataset reconstitution module of the server, the product database by inserting a record corresponding to the third term product dataset as a new convertible term product satisfying market needs.

2. The method according to claim 1, wherein analyzing the capability comprises assessing product positioning for the third term product dataset.

3. The method according to claim 1, wherein analyzing the capability comprises assessing product promotion for the third term product dataset.

4. The method according to claim 1, wherein analyzing the capability comprises assessing advertising for the third term product dataset.

5. The method according to claim 1, wherein analyzing the capability comprises assessing customer satisfaction for the third term product dataset.

6. The method according to claim 1, further comprising generating, by a sales modeling module of the server, a selling model for the third term product dataset.

7. The method according to claim 1, further comprising testing, by a testing module of the server, the third term product in the selling model dataset.

8. The method according to claim 1, wherein the product dataset database comprises records of previous, existing, and future products.

9. The method according to claim 1, wherein the characteristics include at least one of resources available for the project, target market share, desired impact on target market share, and expected return on investment.

10. The method according to claim 1, wherein the at least one other term product dataset is selected by identifying at least one product in the product dataset database having the same parameter or characteristic as the third term product.

11. The method according to claim 1, wherein the at least one other term product dataset is selected by identifying at least one product in the product database having the same parameter or characteristic as the first product dataset.

12. A system comprising:
a server comprising:
an analytics engine manager module of the server configured to:
upon displaying a user interface on a computing device associated with a first user, receive a selection of an existing term product for modification;
a product definition module of the server configured to:
retrieve, from a product database, the existing term product dataset;
retrieve, from the product database, a second term product dataset, wherein the second term product dataset shares at least one characteristic value with the existing term product dataset;
a product analysis module of the server configured to:
evaluate performance of the existing term product dataset against the second term product dataset by comparing a performance value associated with each of the existing term product dataset and the second term product dataset;
a pricing modeling module of the server configured to:
divide the existing term product dataset into constituent parts based on a price of each constituent part;
execute a computer-generated model configured to:
iteratively analyze impact of proposed changes to the constituent parts by comparing the proposed changes to historical data in a database to determine any modification of each constituent to achieve a result by determining at least one constituent part to be modified;
analyze a second user's needs based on user profile comprising user information provided by the user and previously purchased products using natural language processing; and
generate a third term product dataset from the constituent parts based on the second user's needs and assign a new price value to the constituent parts based on the analysis of the impact of proposed changes to the constituent parts and any modification of each constituent; and
a product dataset reconstitution module of the server configured to:
trigger a simulation protocol to analyze a capability of the third term product dataset to address market needs by assessing product pricing for the third term product dataset and determine if the third term product dataset satisfies market needs;
when the third term product satisfies the market needs:
update the product database by inserting a record corresponding to the third term product dataset as a new convertible term product satisfying market needs.

13. The system according to claim 12, further comprising a sales modeling module of the server configured to generate a selling model for the third term product dataset.

14. The system according to claim 12, further comprising a testing module of the server configured to test the new term product dataset in the selling model.

* * * * *